United States Patent [19]
Koizumi et al.

[11] Patent Number: 4,882,559
[45] Date of Patent: Nov. 21, 1989

[54] PERMANENT MAGNET TYPE DEMAGNETIZING HEAD

[75] Inventors: Noboru Koizumi, Hirakata; Kazuya Yamazaki, Neyagawa, both of Japan

[73] Assignee: Matsushita Electric Industrial Co., Ltd., Kadoma, Japan

[21] Appl. No.: 131,392

[22] Filed: Dec. 10, 1987

[30] Foreign Application Priority Data

Dec. 10, 1986 [JP] Japan .............................. 61-294042
Jul. 8, 1987 [JP] Japan .............................. 62-170257

[51] Int. Cl.$^4$ ............................................. H01F 13/00
[52] U.S. Cl. ..................................... 335/284; 361/151
[58] Field of Search ................ 335/284, 306; 361/143, 361/149, 151

[56] References Cited

U.S. PATENT DOCUMENTS 2,897,286 7/1959 Atkinson et al. ............... 335/284 X
3,441,884 4/1969 Eppe .................................... 335/284
4,271,782 6/1981 Bate et al. ...................... 335/284 X Primary Examiner—George Harris
Attorney, Agent, or Firm—Cushman, Darby & Cushman

[57] ABSTRACT

A permanent magnet type demagnetizing head has a first magnetic part disposed on a front part($21a^1$, $21a^2$, $21a^3$) of a tape running surface of a magnetic material, a second magnetic part (21c) disposed on a rear part of the tape running surface and a non-magnetic part or a feeble magnetic part (21b) disposed between the first and the second magnetic parts in the tape running direction; and the first magnetic part is magnetized in a magnetic pattern having plural magnetized regions of one or more N-pole and S-pole; the second magnetic part is magnetized in a magnetic pattern of alternating stripes of N-pole regions and S-pole regions, the boundaries between neighboring N-pole regions and S-pole regions are inclined, and the intensity of magnetization are gradually reduced in the tape running direction.

6 Claims, 5 Drawing Sheets

PERMANENT MAGNET TYPE DEMAGNETIZING HEAD

BACKGROUND OF THE INVENTION

1. Field of the Invention

The present invention relates to a permanent magnet type demagnetizing head for a magnetic recording/reproducing apparatus, having a magnetic pattern of multi-polar magetization, and especially relates to an improved permanent magnet type demagnetizing head which does not affect reproduced signals in later reproduction nor cause even order distortion at a moment when the demagnetizing head separates from the magnetic tape.

2. Description of the Related Art

A permanent magnet type demagnetizing head which having magnetic patterns of multi-polar magnetization is used generally demagnetizing of signals recorded on a magnetic tape. Hereinafter, the words "demagnetizing head" mean the permanent magnet type demagnetizing head. A conventional demagnetizing head is described with reference to FIG. 5 and FIG. 6.

In FIG. 5, a demagnetizing head 1 has a permanent magnet disposed on an upper part of a case 2 and is magnetized in a magnetic pattern which has alternating N-poles and 5-poles. This magnetization produces a gradually reduced alternating magnetic field shown in FIG. 6 By contacting a sliding surface 1a of the demagnetizing head 1 with a magnetic tape 3, the gradually reduced alternating magnetic field is applied to an area on the surface of the magnetic tape 3. Magnetic signals recorded on the area of the magnetic tape 3 are demagnetized by a magnetic force substantially at a magnetically neutral point of the gradually reduced alternating magnetic field.

When a demagnetization of the magnetic tape 3 is suddenly stopped during the demagnetizing operation, the demagnetizing head 1 retreats and separates from the magnetic tape 3. As a result, it is difficult to transcribe a magnetic pattern of the demagnetizing head 1 into the magnetic tape 3 at that time.

During reproduction of the magnetic tape 3, which is transcribed from the magnetic pattern of the demagnetizing head 1, the transcribed magnetic pattern is reproduced and causes an instantaneous large noise (called as stop noise) spoiling of the tone quality.

Other conventional demagnetizing heads developed for reducing the stop noise are described with reference to FIG. 7 and FIG. 8 which show different demagnetizing heads having different magnetic patterns.

The demagnetizing head 11 shown in FIG. 7 is made of a magnetic material and magnetized in a magnetic pattern of alternating plural N-poles and S-poles in which each boundary 12 of the neighboring N-poles and S-poles are inclined at an angle $\theta$ against the widthwise direction Y of a magnetic tape which is substantially the same as that shown in FIG. 5. The respective regions of alternating plural N-poles and S-poles are magnetized producing a force of a magnetic field which is gradually reduced in a tape running direction X. Such a demagnetizing head 11 having a magnetic pattern as shown in FIG. 7, however, has a magnetic flux density lowered to a value which is $\cos \theta$ times that of another demagnetizing head having no incline angle (i.e., $\theta = 0°$), in the tape running direction X, for example, as shown in FIG. 5. As a result, the demagnetizing head 11 shown in FIG. 7 is insufficient for demagnetization a material having high magnetic hysteresis, such as a metallicmagnetic tape.

On the other hand, in a demagnetizing head 13 shown in FIG. 8, a sliding surface 13a is divided into two parts of a first region 14 and a second region 15. The first region 14 is magnetized in alternating N-poles and S-poles in an order of N, S, N, S . . . , gradually reduced alternating magnetization, and the second region 15 is also magnetized in alternating S-poles and N-poles in an order of S, N, S, N . . . , gradually reduced alternating magnetization. Between the first and second regions 14 and 15, a separation gap part 16 is formed.

When applying the demagnetizing head 13 having the above-mentioned constitution to a magnetic tape having a track width Tw, if the magnetic patterns of the demagnetizing head were transcribed to the magnetic tape, the transcribed magnetic patters on the magnetic tape corresponding to the separated first and second regions 14 and 15 in the widthwise direction Y of the track have respectively reversed polarities. Accordingly, the magnetic flux mainly flows between the transcribed magnetic patterns corresponding to the first and second regions 14 and 15, and the magnetic flux between the S-poles and N-poles in the same region is reduced. Thus, the stop noise, which is the reproduction of the transcribed magnetic patterns of the demagnetizing head 13, can be reduced. However, because the magnetic component in the tape running direction X in the separation gap part 16 is zero, the demagnetizing head 13 is insufficient for demagnetizing a part of the magnetic tape which runs over the separation gap part 16, even though the width g of the separationn gap part 16 is almost zero. Also, when the boundary of the first and second regions 14 and 15 is parallel to the tape running direction X, a magnetic component for demagnetizing the magnetic tape in the tape running direction X is zero on the boundary, and hence the demagnetizing head 13 insufficiently demagnetizes.

Furthermore, when a magnetic tape is demagnetized by the above-mentioned demagnetizing head 13 shown in FIG. 8, the final poles of the first and second regions 14 and 15 are transcribed to the magnetic tape and the magnetic tape is not necessarily demagnetized by the magnetic force of the magnetically neutral point of the gradually reduced alternating magnetic field. As a result, a D.C. component of the magnetization remains on the magnetic tape causing an even order distortion in the recording and reproducing operation.

SUMMARY OF THE INVENTION

The object of the present invention is to provide an improved permanent magnet type demagnetizing head wherein generation of stop noise or even order distortion is greatly reduced, even when a magnetic pattern of the demagnetizing head is transcribed on a magnetic tape.

A permanent magnet type demagnetizing head in accordance with the present invetion comprises:

a first magnetic part of a magnetic material which is disposed on a front part of a tape running surface in the tape running direction and magnetized in a magnetic pattern having at least one N-pole region and S-pole region, a second magnetic part of the magnetic material which is disposed on a rear part of the tape running surface in the tape running direction and magnetized in a magnetic pattern having plural regions alternating N-pole and S-pole, the boundaries of the regions being inclined against the widthwise direction of the magnetic tape, and intensity of magnetization being gradually reduced in the tape running direction, and a non-magnetic part or a feeble magnetic part alternatively disposed between the first and second magnetic parts.

In the above-mentioned configuration, the first magnetic part generates a strong magnetic field for demagnetizing the magnetic tape in a saturation level, the second magnetic part generates a gradually reduced alternating magnetic field for making for residual magnetization almost zero and the non-magnetic part or feeble magnetic part reduces the level of the noise when the transcribed magnetic pattern of the demagnetizing head is reproduced.

DESCRIPTION OF THE PREFERRED EMBODIMENTS

Preferred embodiments of a permanent magnet type demagnetizing head in accordance with the present invention are described in the following with reference to FIG. 1(a), FIG. 1(b), FIG. 1(c), FIG. 2 and FIG. 3.

Figure 1:
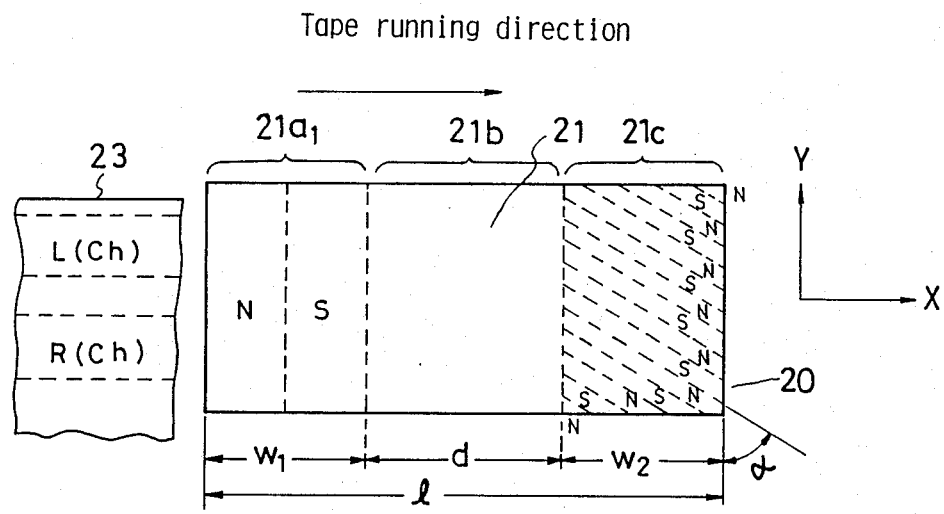
FIG. 1(a) is a drawing for showing magnetic patterns of a demagnetizing head in accordance with the present invention.
FIG. 1(b) is a drawing for showing magnetic patterns of another demagnetizing head in accordance with the present invention.
FIG. 1(c) is a drawing for showing magnetic patterns of still other demagnetizing head in accordance with the present invention.
Figure 1:
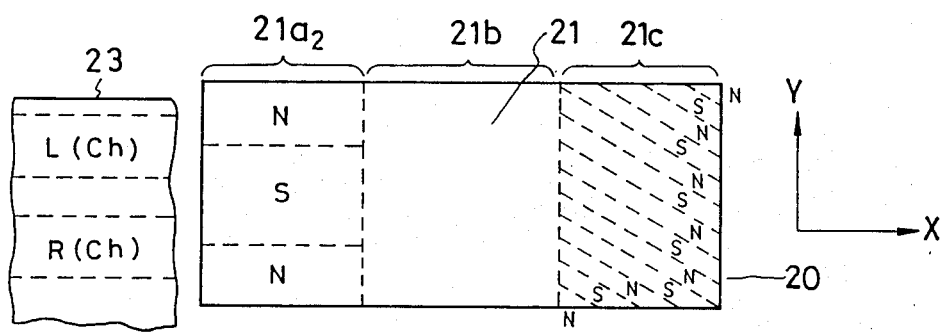
Figure 1:
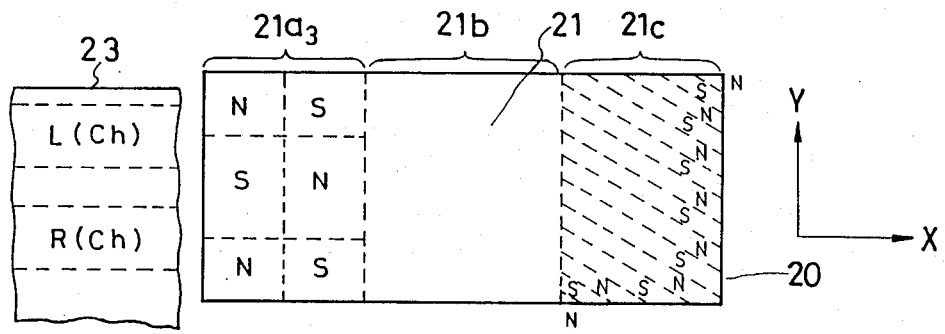

FIGS. 1(a), 1(b), 1(c) show preferred embodiments of magnetic patterns of a demagnetizing head.

In FIGS. 1(a), 1(b) and 1(c), a demagnetizing head 20, a tape running surface 21 made of a permanent magnet, and the magnetic tape 23 are common.

The tape running surface 21 is separated fundamentally into three parts in a tape running direction X. A first magnetic part $21a_1$, $21a_2$ or $21a_3$ is disposed on a front part of the tape running surface 21 in the tape running direction X, and is, for example, magnetized in a magnetic pattern shown in FIG. 1(a), FIG. 1(b) or FIG. 1(c). A part 21b alternatively formed as a non-magnetic part or a feeble magnetic part, which does not affect the magnetic tape at all, is disposed neighboring the first magnetic part 21a. A second magnetic part 21c is disposed on a rear part of the tape running surface 21 in the tape running direction X and is magnetized in a magnetic pattern producing a magnetic force which is gradually reduced in the tape running direction X. The magnetized magnetic pattern of the second magnetic part 21c, which is fundamentally the same as that in FIGS. 1(a), 1(b) and 1(c), consists of plural regions of alternating and neighboring N-poles and S-poles in the tape running direction, the boundary of each neighboring N-pole regions and S-pole regions are inclined at an angle α against the widthwise direction of the magnetic tape 23.

The above-mentioned permanent magnet type demagnetizing head is used for a recording/reproducing apparatus such as a compact cassette tape recorder. When the recording/reproducing apparatus is a Hi-Fi type, the magentic tape is magnetically separated in two parts (upper track part and lower track part) in the widthwise direction of the magnetic tape Y, and the respective separated parts are further separated for a right channel and a left channel. A typical constitution of the demagnetizing head is shown is FIG. 4. The demagnetizing head 20 having magnetized magnetic patterns on the magnetic material is fixed on the upper part of a housing 22 and a non-magnetized magnetic member 24 is fixed on a surface of the demangetizing head 20 for shielding a leakage magnetic flux from the magnetized part of the demagnetizing head 20.

As shown in FIG. 1(a), lengths of the first magnetic part $21a_1$, $21a_2$ and $21a_3$, the non-magnetic or feeble magnetic part 21b and the second magnetic part 21c in the tape running direction are respectively W1, d and W2, and the combined length is l. It was confirmed by an experiment that the intensity of the stop noise, which was the problem of the conventional demagnetizing head, could be varied by a value of d/l, and l and W1 are selected as l=6.8 mm and W1=1.5 mm. The measured result of the experiment is shown in FIG. 2.

Figure 2:
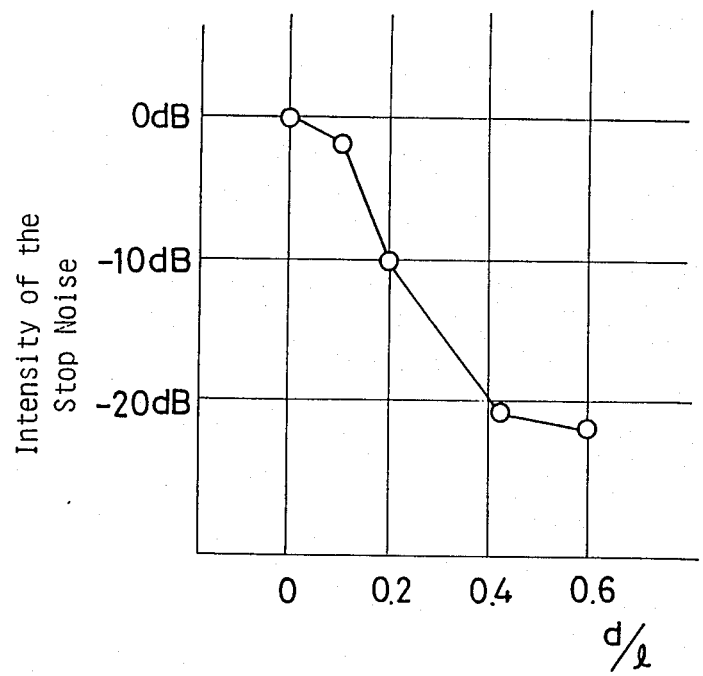
FIG. 2 is a drawing for showing a characteristic curve of an intensity of a noise against a ratio of d/l.

FIG. 2 demonstrates that stop noise reduction by more than 10 dB over a demagnetizing head, which has a first magnetic part neighboring second magnetic part (namely the length of d=0), can be achieved when the length d of the non-magnetic part or feeble magnetic part 21b is longer than one third of the total length l.

Figure 3:
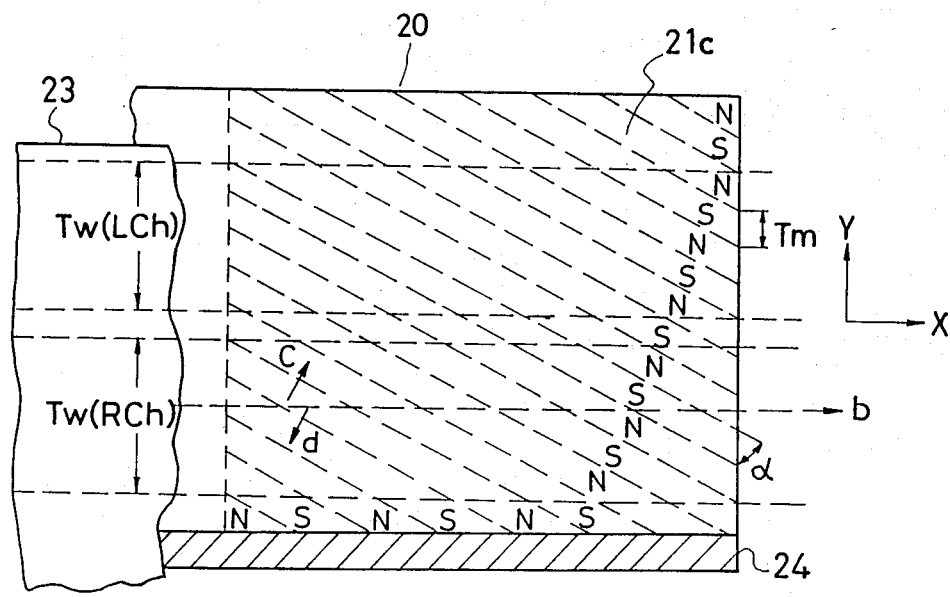
FIG. 3 is a drawing for showing enlarged magnetic patterns of the demagnetizing head shown in FIGS. 1(a), 1(b) and 1(c)

In the above-mentioned demagnetizing head, it is generally impossible to prevent the transcription of the magnetic pattern of the second magnetic part 21c. Therefore, the magnetic pattern shown in FIG. 3 is likely to be transcribed on the magnetic tape 23. When the magnetic tape 23, on which the magnetic pattern of the second magnetic part 21c is transcribed, is reproduced, any noise due to the transcription of the magnetic pattern is not reproduced because the total magnetic flux induced on a reproducing magnetic head becomes zero. The induced magnetic fluxes shown by arrows c and d are in opposite directions and have the same intensities, and hence, the magnetic field is canceled.

With respect to the metallic-magnetic tape having high magnetic hysteresis, using only the second magnetic part 21c can not sufficiently demagnetize the recorded magnetic signals on the metallic magnetic tape. Therefore, demagnetizing heads of the present invention shown in FIG. 1(a), FIG. 1(b) and FIG. 1(c), have the first magnetic parts $21a_1$, $21a_2$ and $21a_3$, making it possible to sufficiently demagnetize the high magnetic hysteresis type magnetic tape 23.

Furthermore, unlike the conventional demagnetizing head, the magnetic pattern of the second magnetic part 21c is formed to cancel the even order distortion. Accordingly, it is substantially possible to improve and reduce the even order distortion.

Figure 4:
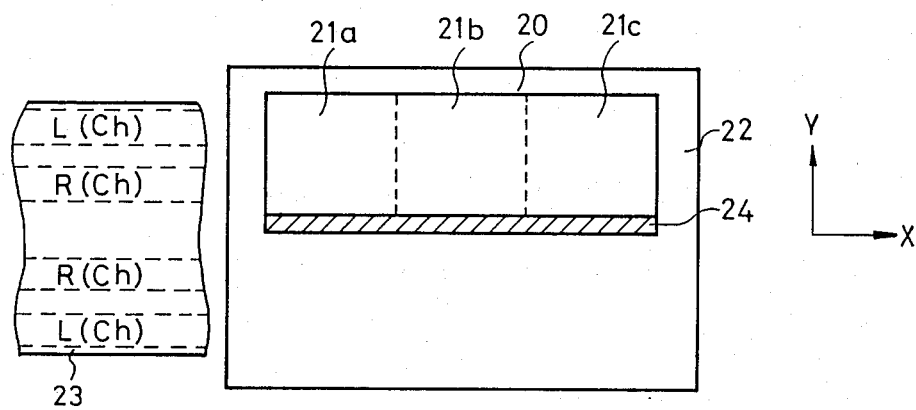
FIG. 4 is a drawing for showing a typical constitution of a demagnetizing head in accordance with the present invention.
Figure 5:
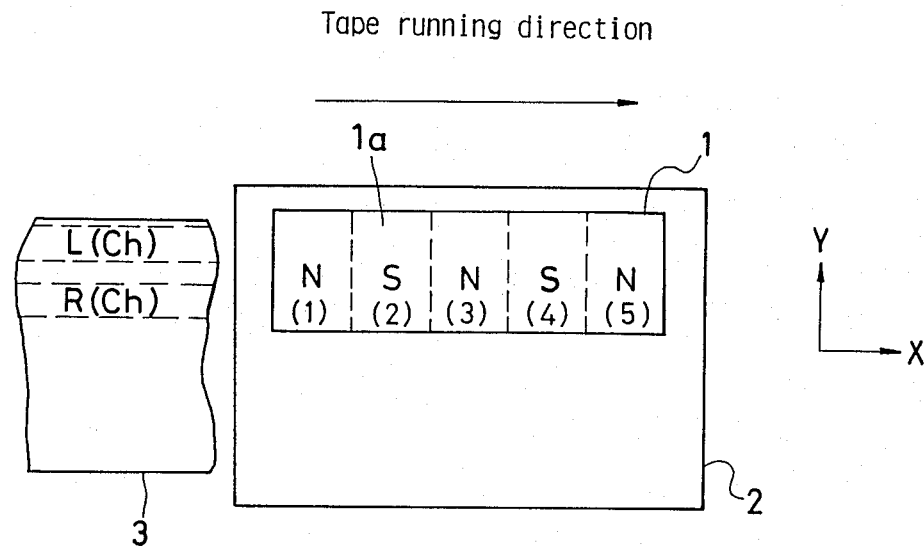
FIG. 5 is the drawing for showing the magnetic patterns of the conventional permanent magnet type demagnetizing head.
Figure 6:
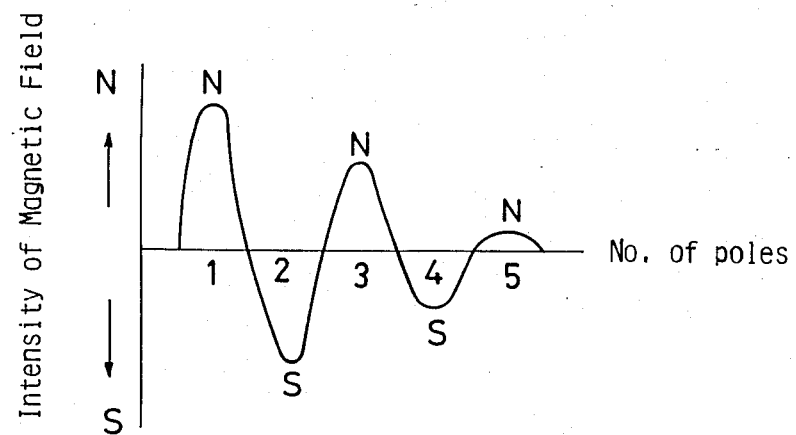
FIG. 6 is the drawing for showing the magnetic force of the conventional demagnetizing head shown in FIG. 4.
Figure 7:
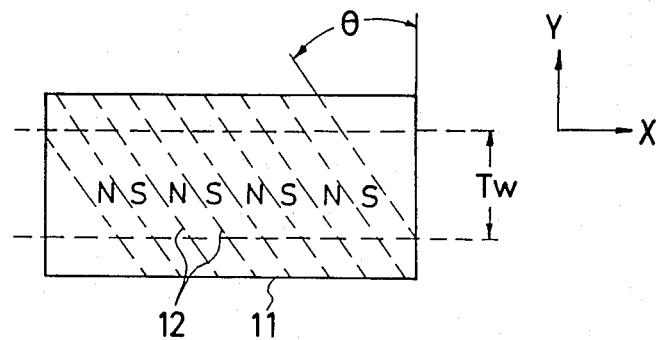
FIG. 7 and FIG. 8 are the drawings for showing the magnetic patterns of other conventional demagnetizing heads.
Figure 8:
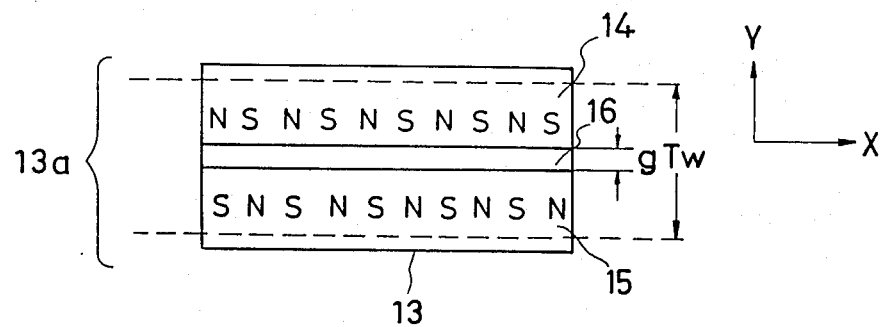

There is an additional problem in the conventional demagnetizing head called cross demagnetization. It is a known phenomenon that the magnetic signals recorded on the other track of the magnetic tape which is not to be demagnetized, are demagnetized by a leakage magnetic flux from the demagnetizing head. The demagnetizing heads of the present invention have a non-magnetized magnetic member 24, for example, permalloy, soft ferrite or the like, fixed on the side wall of the demagnetizing head 20 in the tape running direction, as shown in FIG. 3 and FIG. 4. Therefore, the leakage magnetic flux from the demagnetizing head 20 can be shielded from the other track, which is not to be demagnetized.

Next, comparison experimental results of the noise levels (dB) at separation of the magnetic tape from the demagnetizing head of the present invention shown in FIGS. 1(a), 1(b) and 1(c) and the conventional demagnetizing head having ten-poles of gradually reduced alternate magnetized patterns are shown in the following table, wherein the polarity level of a ten-poles gradually reduced magnetized pattern is taken as 0 dB.

cancelled because the intensity of the magnetic fields in the clockwise direction and that in the counterclockwise direction applied to a reproducing head are made the same value, by making the total area of the magnetized parts of N-pole and S-pole substantially the same.

In FIG. 1(c), the first magnetic part $21a_3$ is divided into plural magnetized parts in the tape running direction X and the widthwise diretion Y of the magnetic tape. In this embodiment, strong magnetic fields are generated in the tape running direction X and the widthwise location Y of the magnetic tape, and hence, high demagnetizing ratios against the tape running direction X and the widthwise direction Y of the magnetic tape can be obtained. This constitution can reduce the stop noise by the same reasons as the above-mentioned embodiments. The degree of improvement of the demagnetizing characteristics for the demagnetizing ratio and the stop noise in order of the embodiments shown are FIG. 1(b), FIG. 1(c) and FIG. 1(a). The embodiment shown in FIG. 1(c) is a relatively easy manufacturing technique for magnetizing the magnetic poles. Generally, which type is to be adopted should be decided by the relation of the price and performance of the tape recorder and the like.

|  | 1st pole | 2nd pole | 3rd pole | 4th pole | 5th pole | 6th pole | 7th pole | 8th pole | 9th pole | 10th pole | Average |
|---|---|---|---|---|---|---|---|---|---|---|---|
| Prior art (dB) | 0 | 0 | 0 | 0 | 0 | 0 | 0 | 0 | 0 | 0 | 0 |
| The present invention (dB) | −18 | −20 | −19 | −21 | −17 | −18 | −19 | −20 | −20 | −20 | −19.2 |

As mentioned above, the first magnetic part 21a of the demagnetizing head of the present invention can demagnetize the magnetic signals recorded on the magnetic tape to an almost 0 level, by applying the magnetic field up to a saturated level, and subsequently applying a magnetic field of the second magnetic part 21c which generates the gradually reduced alternating magnetic field.

Details of the first magnetic parts $21a_1$, $21a_2$ and $21a_3$ are described in the following.

In FIG. 1(a), two or more magnetized parts capable of applying a saturation magnetic field to the magnetic tape are provided in the tape running direction X. The magnetic signals recorded on the magnetic tape are recorded in horizontal direction. In such a case, existence of a different pole adjacent to the N-pole or S-pole can produce a high horizontal magnetic field, and hence the demagnetization can be made in a high demagnetizing ratio. Also, the security of contacting of the magnetic tape can be increased as the number of poles exceeds 2. And it is desirable that the number of poles is at least 3 in the front part of the tape running direction in order to lower the stop noise.

In FIG. 1(b), the first magnetic part $21a_2$ is divided into two or more magnetized parts in the widthwise direction Y of the magnetic tape. Such constitution can make the horizontal magnetic field strong and the demagnetizing head can obtain a high demagnetizing ratio. A preferable number of dividing the magnetized parts is three or more because the high demagnetizing ratio can be obtained by dividing the pole on the separation zone whereby the tracks of the magnetic tape for the right channel and the left channel are divided. The advantage of this constitution is that the magnetic flux in the widthwise direction Y of the magnetic tape is While specific embodiments of the invention have been illustrated and described herein, it is realized that modifications and changes will occur to those skilled in the art. It is therefore to be understood that the appended claims are intended to cover all modifications and changes as fall within the true spirit and scope of the invention.

What is claimed is:

1. A permanent magnet type demagnetizing head comprising:
    a first magnetic part of a magnetic material which is disposed on a front part of a tape running surface in a tape running direction and magnetized in a magnetic pattern having at least one N-pole region and S-pole region,
    a second magnetic part of said magnetic material which is disposed on a rear part of said tape running surface in the tape running direction and magnetized in a magnetic pattern having plural regions alternating N-pole and S-pole, the boundaries of said regions being inclined against a widthwise direction of a magnetic tape, and intensity of magnetization being gradually reduced in the tape running direction, and
    one of a non-magnetic part and a feeble magnetic part being alternatively disposed between said first and second magnetic parts.

2. A permanent magnet type demagnetizing head in accordance with claim 1, wherein
    said first magnetic part is magnetized in a magnetic pattern having plural magnetized regions of alternating N-pole and S-pole in the tape running direction.

3. A permanent magnet type demagnetizing head in accordance with claim, wherein
   a non-magnetized magnetic member is fixed on a side wall of said magnetic material near to the center of said magnetic tape.
   a first magnetic part of a magnetic material 4. A permanent magnet type demagnetizing head comprising:
   a first magnetic part of a magnetic material which is disposed on a front part of a tape running surface in a tape running direction and magnetized in a magnetic pattern having at least one N-pole region and S-pole region alternately divided in a widthwise direction of a magnetic tape,
   a second magnetic part of said magnetic material which is disposed on a rear part of said tape running surface in the tape running direction and magnetized in a magnetic pattern having plural regions alternating N-pole and S-pole, the boundaries of said regions being inclined against the widthwise direction of said magnetic tape, and intensity of magnetization being gradually reduced in the tape running direction, and
   one of a non-magnetic part and a feeble magnetic part being alternatively disposed between said first and second magnetic parts.

5. A permanent magnet type demagnetizing head comprising:
   a first magnetic part of a magnetic material which is disposed on a front part of a tape running surface in a tape running direction and magnetized in magnetic patterns having plural N-pole regions and plural S-pole regions in both the tape running direction and a widthwise direction of a magnetic tape,
   a second magnetic part of said magnetic material which is disposed on a rear part of said tape running surface in the tape running direction and magnetized in a magnetic pattern having plural regions alternating N-pole and S-pole, the boundaries of said regions being inclined against the widthwise direction of said magnetic tape, and intensity of magnetization being gradually reduced in the tape running direction, and
   one of a non-magnetic part and a feeble magnetic part being alternatively disposed between said first and second magnetic parts.

6. A permanent magnet type demagnetizing head in accordance with claim 5, wherein
   respective said plural N-pole regions and said plural S-pole regions are alternating and neighboring in the tape running direction and also in the widthwise direction of said magnetic tape.

* * * * *